Dec. 19, 1922.
T. G. MOLNAR.
GAS METER.
FILED JULY 6, 1920.
1,439,185
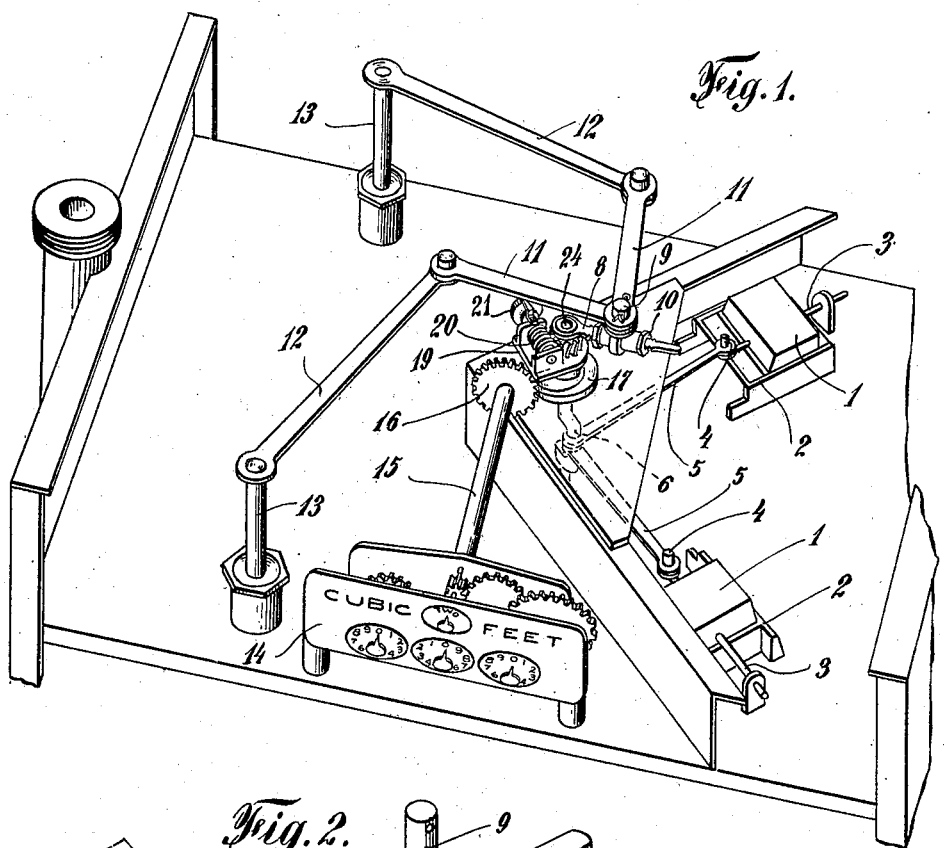
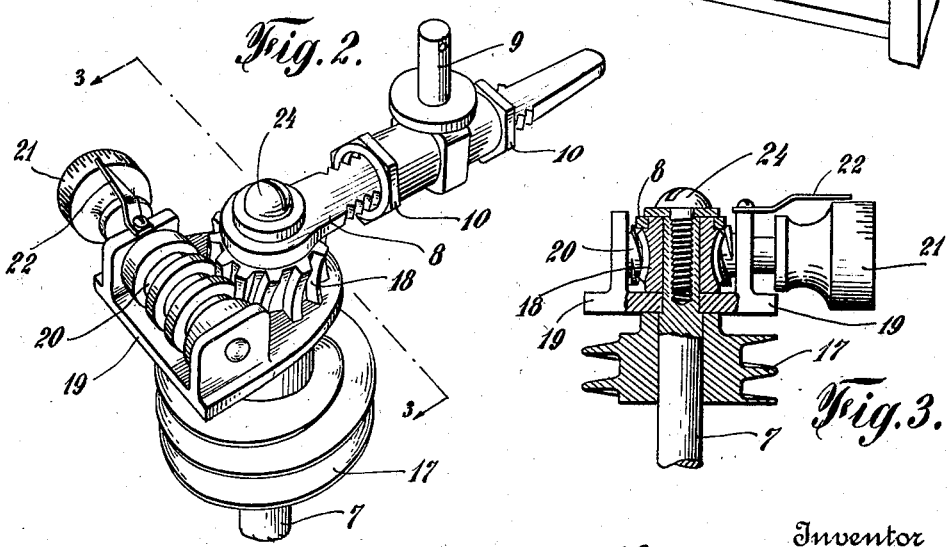
Inventor
Theodore G. Molnar
By his Attorney
Harry C. Lewis.

Patented Dec. 19, 1922.

1,439,185

UNITED STATES PATENT OFFICE.

THEODORE G. MOLNAR, OF NEW YORK, N. Y.

GAS METER.

Application filed July 6, 1920. Serial No. 394,081.

*To all whom it may concern:*

Be it known that I, THEODORE G. MOLNAR, citizen of the United States, residing at borough of Manhattan, city, county, and State of New York, have invented certain new and useful Improvements in Gas Meters, of which the following is a specification.

My invention relates to gas meters of the dry type commonly used in dispensing illuminating gas to consumers, and has for its objects accuracy and ease in adjusting these meters.

In meters of the type upon which my invention is an improvement, gas-controlling valves are operated by the crank of a crank shaft driven by a crank arm thereon called a tangent arm. In order that the meter shall operate properly it is necessary that the tangent arm shall bear a correct angular relation to the valve-operating crank, and sometimes it is necessary, particularly in making repairs, to adjust the tangent arm rotatively on the crank shaft. Heretofore the tangent arm has been fixed on the upper end of the crank shaft by means of a drop of solder, and in order to make adjustment it has been necessary to melt the solder, and then there was no way of assuring accuracy in making the adjustment.

My present invention includes means, such as worm gearing, for rotatively adjusting the tangent arm on the crank shaft.

I shall now describe the embodiment of my invention shown in the accompanying drawings and shall then point out my invention in claims.

Figure 1 is a perspective view of the top of a meter embodying my improvement with the top cover and other parts removed.

Figure 2 is an enlarged perspective view of the crank shaft and its adjuncts, embodying my improvement.

Figure 3 is a further enlarged vertical section centrally of the upper end of the crank shaft on a plane indicated by the line 3—3 of Figure 2 as viewed from the right.

In gas meters of the type referred to, gas-controlling valves 1 slide on valve seats 2 and are guided by wires 3 carrying wrist pins 4 connected by valve-operating arms 5, with a crank 6 on the lower end of a vertical crank shaft 7 on the upper end of which is fixed a tangent arm 8 carrying a post 9 adjustably held in place by a pair of jam nuts 10. The tangent arm post 9 forms a crank pin and has connected thereto a pair of short flag arms or links 11 which are connected to long flag arms 12 on the upper ends of flag rods 13. The oscillating or rocking movement of the flag rods 13 rotates the crank shaft 7 and operates the slide valves 1 in a well known manner. The index, indicated generally by the reference numeral 14, is operated by a horizontal axle 15 carrying a gear wheel 16 which is engaged by a spiral or worm 17 carried by the crank shaft 7.

According to my invention, the tangent arm 8 is adjustably fixed on the crank shaft 7 through the intermediary of manually operable worm gearing. The tangent arm 8 is rotatively mounted upon the upper end of the crank shaft 7 and is fixed upon a worm wheel 18, which is free to rotate on the crank shaft 7. A bracket 19 removably fixed upon the crank shaft 7 just below the worm wheel 18 has journaled thereon a worm 20 engaging with the worm wheel 18, and the screw-threads of the worm 20 closely fit between the teeth of the worm wheel 18 so as to prevent any lost motion or back lash. The projecting end of the worm 20 carries a knob 21 adapted to be manually rotated and the periphery of which has graduating marks thereon as shown with which a pointer 22 secured on the bracket 19 co-operates to indicate the amount of adjustment made. The bracket 19, and worm wheel 18, carrying with it the tangent arm 8, are removably retained on the upper end of the crank shaft 7 by a washer and tap screw 24.

It is evident that merely by turning the knob 21 the valve-operating crank 6 may be adjusted to any desired angle relatively to the tangent arm 8 by which the crank shaft 7 is rotated.

It is obvious that various modifications may be made in the construction shown in the drawings and above particularly described within the principles and scope of my invention.

I claim:—

1. In a gas meter having a valve-operating crank shaft rotated by a tangent arm, a bracket removably mounted on the end of the crank shaft, a gear wheel rotatably mounted on the end of the crank shaft above the bracket and secured to the tangent arm, a worm gear mounted on the bracket and adapted to engage the gear wheel and an indicating member co-axially mounted with the worm gear and adapted to rotate the worm gear.

2. In a gas meter having a valve-operating crank shaft rotated by a tangent arm, a bracket removably mounted on the end of the crank shaft, a gear wheel rotatably mounted on the end of the crank shaft above the bracket and secured to the tangent arm, removable retaining means mounted on the upper end of the crank shaft for holding the tangent arm, bracket and gear wheel in position, a worm gear mounted on the bracket and adapted to engage the gear wheel and an indicating member co-axially mounted with the worm gear and adapted to rotate the worm gear.

In testimony whereof, I have signed my name to this specification, this 19th day of June, 1920.

THEODORE G. MOLNAR.